UNITED STATES PATENT OFFICE.

GEORGE J. COLBY, OF WATERBURY, VERMONT.

IMPROVED MODE OF FASTENING INDIA-RUBBER ROLLS TO METALLIC SHAFTS.

Specification forming part of Letters Patent No. 34,818, dated April 1, 1862; Reissue No. 1,992, dated June 13, 1865.

*To all whom it may concern:*

Be it known that I, GEORGE J. COLBY, of the town of Waterbury, in the county of Washington, State of Vermont, have invented certain new and useful improvements in the manner of fastening or uniting vulcanized india-rubber, gutta-percha, or other similar gummy substances to iron shafts, metallic, wood, or other surfaces; and I do hereby declare that the following is a full, clear, and exact description of the same.

My invention consists in the application of heat to that portion of vulcanized india-rubber, gutta-percha, or other similar gums that comes in contact with the metal shafts, wood, or other substances to be cemented or united thereto to such a degree that it will melt the vulcanized india-rubber or gum sufficient to bring it into a plastic sticky state while hot, when it is applied to heated iron shafts or other substances, so that when cooled off they will be firmly cemented together.

To enable others skilled in the art to prepare and use my invention, I will describe it more in detail.

To make elastic rollers for clothes-wringers and other purposes, the india-rubber tube is prepared in the usual manner, the hole through for the shaft being somewhat less than the diameter of the iron shaft. I then heat the shaft until it will melt or soften the vulcanized rubber enough to make it sticky. I then push the rubber tube onto the heated shaft, which melts or softens it sufficiently to lubricate itself, and if the iron shaft is at a proper heat will go on easily, and when in its place may be set and cooled off by plunging into cold water. By this process the vulcanized india-rubber becomes cemented or united to the iron shaft, so that it cannot be removed without tearing the roll in pieces. To cement rubber, gutta-percha, or other gums to metal, wood, or other substances, I apply heat to both the surfaces that are to go together, sufficient to melt or make the gum sticky; then place the parts together and cool them off, and they are firmly united, so that they cannot be separated otherwise than to tear the gum from the other substance.

Having thus described my invention, what I claim as new, and desire to secure by Letters Patent, is—

The process of forming a cement to fasten vulcanized india-rubber, gutta-percha, or other similar gums to metal, wood, or other substances by heating the surface of the gum sufficiently to melt it to a sticky state, and then applying it in that state to other heated substances, and cool off, as herein specified.

GEO. J. COLBY.

Witnesses:
D. A. M. MITCHELL,
WM. C. BOTSFORD.